Figure 1:
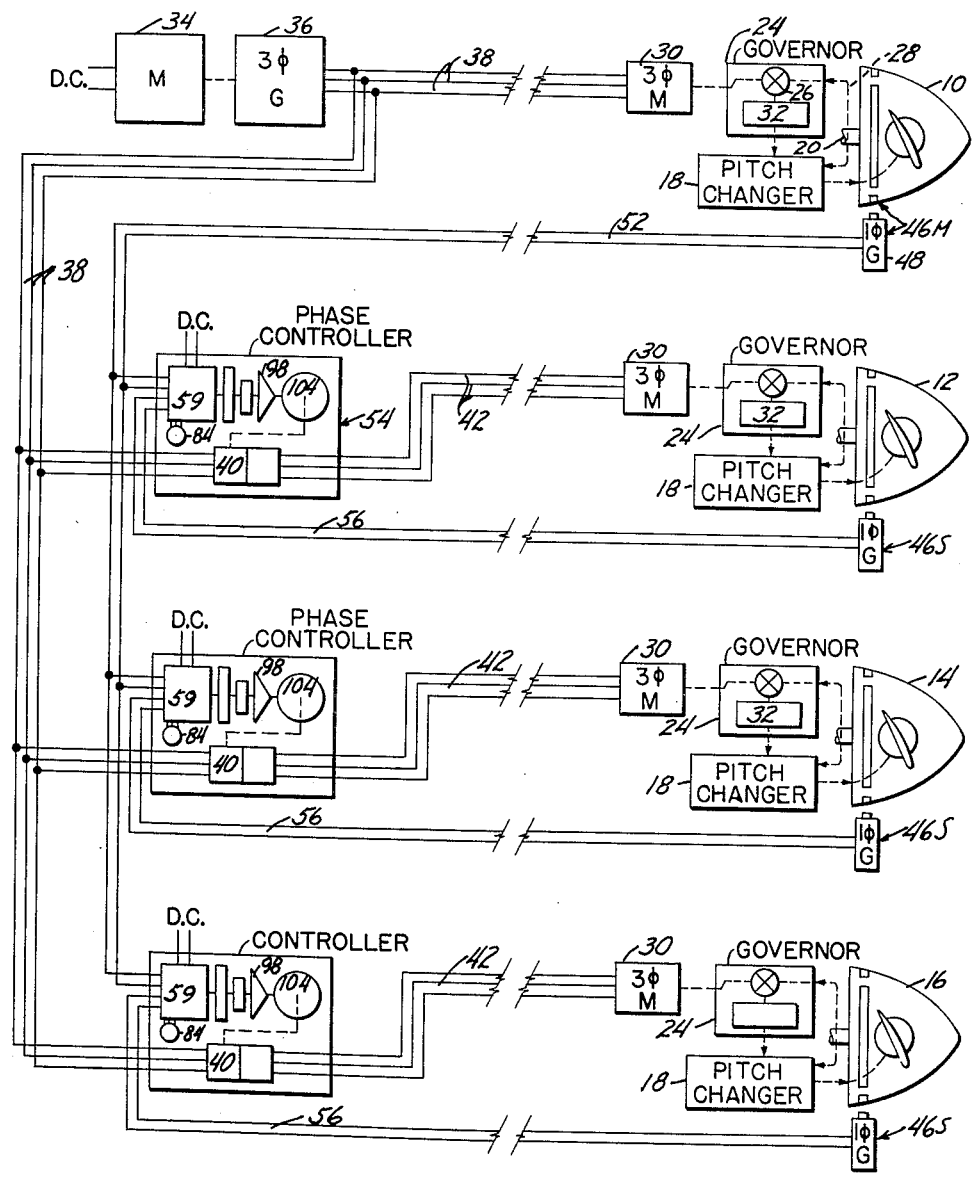

Dec. 4, 1962 L. E. BARNES 3,066,741
PROPELLER SYNCHRONIZING AND SYNCHROPHASING SYSTEM
Filed Oct. 19, 1959 2 Sheets-Sheet 1

INVENTOR.
LELL E. BARNES
BY
ATTORNEY

Dec. 4, 1962

L. E. BARNES 3,066,741

PROPELLER SYNCHRONIZING AND SYNCHROPHASING SYSTEM

Filed Oct. 19, 1959

2 Sheets-Sheet 2

INVENTOR.
LELL E. BARNES

BY *Godfrey O. Speir*

ATTORNEY

United States Patent Office 3,066,741
Patented Dec. 4, 1962

3,066,741
PROPELLER SYNCHRONIZING AND
SYNCHROPHASING SYSTEM
Lell E. Barnes, North Caldwell, N.J., assignor to Curtiss-Wright Corporation, a corporation of Delaware
Filed Oct. 19, 1959, Ser. No. 847,295
4 Claims. (Cl. 170—135.29)

This invention relates to synchronization of speed and blade phase relation of two or more propellers, particularly as used in aircraft, and more broadly, to speed and position relation synchronization during rotation, of two or more rotating bodies or machine components.

The invention provides equipment for blade phase synchronization primarily where the system is already equipped with a speed synchronization system. The latter types of system are fairly well established in the art. Some available established systems include a computer mechanism associated with each propeller which senses a speed error between the propeller and a desired speed, converting this input signal into a stabilized signal which calls for the change in blade angle of the propeller necessary to restore it promptly to the desired speed without hunting or over correcting. Such a speed synchronizing system is disclosed in Mergen et al., Patent No. 2,720,927 issued October 18, 1955. Therein each propeller is equipped with electromechanical clutches and a normally engaged electromagnetically releasable brake. The clutches are energized respectively for increase or decrease of blade pitch and the brake, normally holding fixed blade pitch, is disengaged concurrently with the engagement of either clutch. The clutches and brake of each propeller are controlled by a mechanical proportional-plus-integral computer in response to speed error existing between the propeller and a master speed source. The disclosure of said patent also includes a standby governor for each propeller which is operative to hold set propeller speed without synchronization should the synchronizing system be inoperative. The synchronizing system includes a central master speed motor driving an alternator, the alternator being connected to a synchronous motor installed near each propeller, the motor providing the speed reference for its propeller. The electrical transmission from the master speed alternator to the synchronous motor is energized in accordance with the speed desired.

The foregoing system, while providing speed synchronization does not provide positive blade synchronization between several propellers due to slip and yield in the blade pitch change mechanism. That is, two propellers may be speed synchronized, but their blades may assume random positions, with respect to one another. In blade phase synchronization not only is the speed synchronized, but also the blade positions relative to one another during opreation. For example, a master propeller may have its blade instantaneously in a vertical position and the slave propeller will also have its blade in the vertical position, or at any desired predetermined blade phase angle relative to the other propeller.

In the present system, a blade phase trimming system is provided which inserts correction in the aforesaid electrical transmission lines whereby, if a slave propeller is not in blade phase with a master propeller, small pitch change corrections will be applied to the slave propeller to accelerate or decelerate the propeller until such time as the blade phase relationship is as desired. In view of the fact that the blade phasing system is used with a stabilized speed control system, the blade phasing system itself need not include stabilization since the precision of speed phasing is accurate and fast enough to compensate for dynamic effects imposed by blade phase correction signals.

A blade phase synchronizer of a type related to the present invention is disclosed in Hine Patent No. 2,747,-141, issued May 22, 1956. The present invention comprises improvements in some of the concepts and equipment set forth in this Hine patent.

Objects of the present invention are to provide improvements in blade phase synchronizers for multiple aircraft propellers and powerplants; to provide a blade phase synchronizer adapted to be superimposed on existing compatible types of propeller synchronizing apparatus; to provide a blade phase synchronizer wherein one propeller is used as a master blade phase reference and wherein other propellers are slaved to it so that their blade phase relationship will coincide with, or bear a set relationship to, the blade phase of the master propeller; to provide a blade phase synchronizer which will have a high degree of reliability and, should failures occur in it, which will not precipitate failures in the speed synchronizing system, in the pitch changing controls or any other components of the system which require prime reliability; to provide a blade phase synchronizer wherein blade phase relationships between different propellers may be readily adjusted to desired values; and to provide a blade phase synchronizing system which in itself is relatively simple and compact so that it will not unduly complicate or increase the weight of the aircraft or other apparatus with which it is associated.

While the foregoing objects and other text herein mentions propellers and blade phase synchronization, the invention also encompasses phase synchronization of other types of multiple rotary equipment, where specific rotational position relationships are desired during operation.

Figure 2:
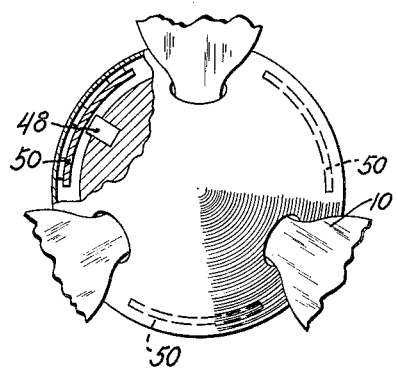
Figure 3:
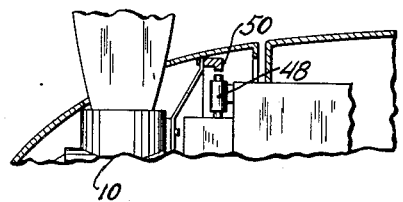
Figure 4:
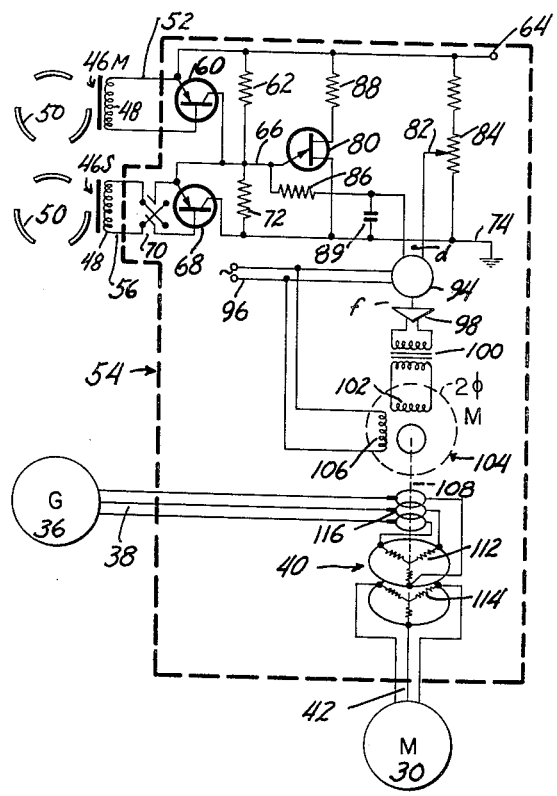
Figure 5:
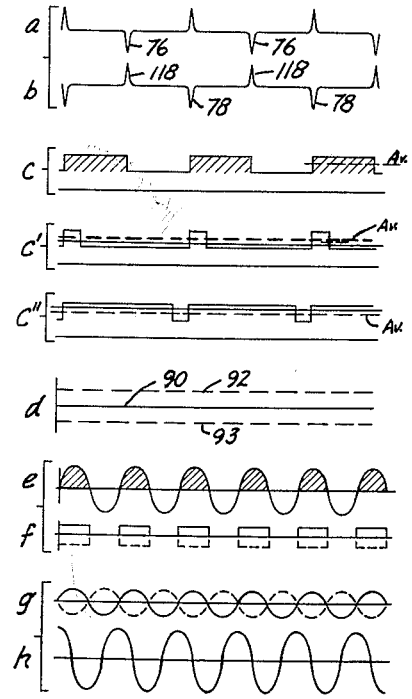

Other objects of the invention will become apparent in following the annexed detailed description which should be read in connection with the drawings wherein:

FIG. 1 is a diagram of the general components of a multipropeller system including a speed synchronizing system and a blade phase synchronizing system according to the invention, FIG. 2 is a front elevation, partly broken away, of a propeller including an electrical impulse generator forming part of the system, FIG. 3 is a fragmentary axial system through a propeller and part of the impulse generator, FIG. 4 is a diagram of the electrical circuit system and associated apparatus used as a blade phase controller in each of the phase control channels shown in FIG. 1, FIG. 5 is a group of pulse and wave diagrams showing such forms as they appear at different zones in FIG. 4.

Referring to FIG. 1, major elements of the existing speed synchronizing control system will be briefly described to provide a suitable environment for the blade phase control system which will later be described in detail.

Four controllable pitch propellers are represented at 10, 12, 14 and 16, these propellers being substantially identical and if desired of a type such as that shown in the aforesaid Mergen et al. patent. However, the specific form of the propeller or its mechanism is not important since other types than that shown in the Mergen et al. patent can be adapted for blade phase synchronization. Each propeller is equipped with a pitch changer 18 which derives power from a propeller driving shaft 20 and furnishes pitch changing power to the blades of the propeller through a transmission linkage 22. Control of each pitch changer 18 is accomplished by a governor 24. Each governor comprises a differential 26 which compares propeller speed derived from a transmission link 28 with desired master speed derived from a synchronous electric motor 30. Output of each differential 26 is transmitted to a computer 32 as an input signal, the computer modifying this signal to a stabilized proportional-plus-integral output in terms of blade angle desired, actuating the associated pitch changer 18.

Desired reference or master speed is preferably produced by a precisely speed-controlled D.C. motor 34 which drives one or more multiphase alternator 36, the electrical output of the latter being connected to the several synchronous motors 30 through transmission lines 38. As regards the propeller 10, transmission lines 38 connect directly from the alternator 36 to its synchronous motor 30. As regards propellers 12, 14 and 16, the transmission lines 38 go to rotary transformers 40 and thence through transmission lines 42 to the respective synchronous motors 30.

Assuming that the rotary transformers 40 were not present and that transmission lines 38 connected directly with transmission lines 42, all four propellers would be directly speed-slaved to the master speed alternator 36. Assuming the presence of the rotary transformers 40 as shown, propeller 10 is directly slaved to the alternator 36 but propellers 12, 14 and 16 are slaved to alternator 36 through the rotary transformers which are capable, as will be described, of modifying the electrical phase or cyclic relationship of the transmission lines 42 relative to the transmission lines 38. The rotary transformers 40 are used to modify the master speed system to attain blade phase synchronization as a trimming control on speed synchronization.

Propeller 10 is equipped with an electrical pulse generator 46M. This, as shown in FIGS. 2 and 3, comprises a simple electromagnetic pickup 48 secured to a nonrotating part of the powerplant, the pickup comprising preferably a magnet 44 upon which an electrical winding is installed. The generator 46M further comprises a plurality of magnetically permeable arcuate bands 50, secured to the spinner embracing the propeller hub. During propeller rotation, the bands 50 rotate with the propeller and pass across the core of the pickup 48. As the band first reaches the pickup, a pulse of one direction will be created and when the band passes beyond the pickup a pulse in the other direction will be created. In the three-bladed propeller shown, three equally spaced bands 50 are used, each band embracing an arc of 60°. Thus, during one turn of the propeller there will be equally three positive pulses and three negative pulses, the location of the pulses indicating in effect, the particular positions of the propeller blades as they rotate, with respect to some datum such as the aircraft structure.

Each of the other propellers is equipped with a similar pulse generator 46S. The generator 46M of propeller 10, which acts as a blade phase master, is connected by transmission lines 52 to a plurality of blade phase controllers 54, one for each propeller 12, 14 and 16. The pulse generators 46S of propellers 12, 14 and 16 are each connected by transmission lines 56 to the respective phase controllers 54 serving the corresponding phase-slaved propellers. Each phase controller, thus, has an input through lines 52 from the master blade phase pulse generator, and an input through lines 56 from the corresponding slaved blade phase pulse generator.

The three bands 50 of each pulse generator 46M and 46S enable any blade of the three on propeller 10 to become the master, and any of the three blades on each of propellers 12, 14 and 16 to become a slave. Thus, blade phase synchronization errors can never be more than 60° and blade phase synchronization is attained quickly and accurately. If it is desired to have one particular blade on propeller 10 as the master, and one particular blade on each other propeller the slave, then the pulse generators would be arranged for one pulse per revolution, rather than three. The latter modification would also be appropriate for maintaining speed and phase synchronization of other kinds of rotating machinery or equipment.

Reference may now be made to FIG. 4 which shows one form of phase controller in detail, along with related apparatus already described.

The desideratum in the phase controller 54 is to discriminate the blade phase pulses of the master pulse generator 46M and the slave pulse generator 46S to establish the lag or lead of one with respect to the other, to establish the amount of lag or lead, to convert the discriminated signal to usable form, and to apply this useful signal between the master alternator 36 and slave synchronous motors 30. The signal application modifies the energy in the lines 42 relative to that in the lines 38 in such a manner that the slave propeller governors correct slave propeller blade pitch to the extent necessary to attain blade phase synchronization. The latter equipment operates in exactly the same fashion as though blade phase synchronization were not present. They merely respond to the dictates of slave synchronous motors 30 as altered by the phase controller.

The upper left hand corner of FIG. 4 shows a bi-stable or flip-flop circuit 59, using transistors and a unijunction transistor to establish a voltage output from the network which is a measure of the direction and magnitude of phase error between the master and slave propellers. Specifically, a transistor 60 has signal inputs from lines 52, connected with pulse generator 46M, and is shunted by a resistor 62 connected to its output terminals and to a positive direct current input 64 and a central lead 66. A transistor 68 has signal inputs from leads 56, connected with pulse generator 46S through a polarity reversing switch 70, transistor 68 being shunted by a resistor 72 connected at its terminals to the lead 66 and to ground 74. Whenever a negative pulse 76 (FIG. 5a) reaches transistor 60, from master pulse generator 46M, the transistor shorts resistor 62 placing full D.C. potential on the lead 66. Whenever a negative pulse 78 (FIG. 5b) reaches the transistor 68 from slave pulse generator 46S, resistor 72 is shorted, placing the lead 66 at ground potential. Lead 66 connects to the emitter of a unijunction transistor 80 whose base terminals are connected to the voltage supply 64 and to ground. The characteristics of the transistor 80 are such that it requires high voltage to trigger it to conduct from leads 74 to 66. After the high voltage pulse, transistor 80 will continue to conduct while moderate voltage remains on the lead 66 and on the emitter of transistor 80. Transistor 80 will cease to conduct significant amounts of power when the voltage on its emitter and thus on lead 66 is dropped to zero. Transistor 80 will conduct during the interval between the master pulse 76 and the slave pulse 78, but will not conduct during the interval from the slave pulse 78 to the master pulse 76.

The output of the foregoing network is taken from lead 66 and from an adjustable tap 82 on a potentiometer 84 between power supply and ground. This provides a voltage between some positive value from the potentiometer and ground, when the transistor 80 conducts. Suitable resistors 86 and 88 are inserted in the circuit to provide bias in accordance with the characteristics of the transistors chosen. Also, resistors 84 and 86 in conjunction with capacitor 89 provide a filter network which levels the voltage output of the circuit to a steady D.C. potential whose polarity is established by the lag or lead of the pulses 76 relative to pulses 78.

FIG. 5c shows the square wave resulting from the action of the transistor network before filtering, when the interval between pulses 76 and 78 is uniform. This is typical of the situation when the blade phase of the master and slave propellers are as desired.

FIG. 5c' shows the square wave when the pulses 76 and 78 are displaced in one direction and FIG. 5c'' shows the square wave when the pulses 76 and 78 are displaced in the other direction.

In diagram 5c, the square waves produce an average E.M.F. as noted, which is used as a datum. In FIG. 5c' the square waves produce an average E.M.F. which is less than the datum, and in FIG. 5c'' the square waves produce an average E.M.F. which is greater than the datum. After filtering and biasing through the potentiometer 84, these average E.M.F.'s take the form of FIG. 5d wherein the central line 90 is the datum, the upper dotted line 92 is the steady D.C. voltage corresponding to blade phase error in one direction, and the line 93 is the steady D.C. voltage corresponding to blade phase error in the other direction. This is the pattern which is found at the output d of FIG. 4 of the transistor circuit above described.

This output is fed through a chopper 94 energized by a constant frequency A.C. current as at 96, this alternating energy being represented at FIG. 5e. The chopper output at f in FIG. 4 and at FIG. 5f comprises an interrupted D.C. of zero E.M.F., positive E.M.F., or negative E.M.F. This signal is amplified in a conventional amplifier 98 and passes to a transformer 100, the transformer output being connected to one phase winding 102 of a two-phase motor 104. The wave form in FIG. 5g is that which is received by the winding 102. The solid wave line represents the signal of one direction and the dotted line represents a signal of the other direction which is 180° out of phase with the first. The amplitude of the waves of FIG. 5g depends upon the magnitude of the direct current voltages from FIG. 5d. A second winding 106 of the two-phase motor 104 is preferably energized from the same source 96 which feeds the chopper 94 which has the wave form of FIG. 5h. The windings 102 and 106 are organized so that their fields are 90° apart, and produce motor rotation in one direction or the other depending on energization of field 102 in one or the other phase of FIG. 5g. Also, the motor is rotated at a speed more or less proportional to the amplitude of the energy in the winding 102.

This motor 104 has a mechanical output 108 driving the rotary element of the rotary transformer 40. This transformer comprises sets of multiphase windings 112 and 114 rotatable relative to one another by the motor 104. One set of windings such as 112 is fed from the master alternator 36 through suitable slip rings 116, and the other winding 114 as shown comprise an output which feeds the slave synchronous motor 30 through leads 42. The rotary transformer 40 continually transmits energy from the alternator 36 to the synchronous motor 30 but the phase and cyclic relation of the transmission is modified by the relative rotation of the windings 112 and 114, there being lead or lag in the transmission depending upon the direction and rate of rotation of the two-phase motor 104.

From the above it will be appreciated that the slave synchronous motor 30 will at all times receive transmission from the master alternator 36 so that this slave synchronous motor will control the corresponding propeller to rotate substantially at the speed dictated by the alternator 36. However, the transmission is modulated by blade phase error resulting from the phase controller whereby the synchronous motor 30 not only calls for desired speed of the slave propeller but also calls for blade phase angle to match that of the blade phase master propeller 10.

Adjustment of the potentiometer 84 in FIG. 4 enables modification of the average datum voltage feeding the chopper 94 so that desired relationships of blade position with respect to their phasing may be established. This range enables relative blade positioning to plus or minus 30° of a slave blade relative to a master blade. To broaden the scope of the system to plus or minus 60° it is merely necessary to change the polarity of input to the transistor 68 by the reversing switch 70 so that, instead of using pulses 78 for stopping operation of the flip-flop network, the other normally positive pulses 118 would be used. As noted in FIG. 5b pulses 118 lie midway between successive pulses 78 so that when pulses 118 are made negative through polarity changing, they act as the stopping pulses for discriminator action and extend the scope of blade phase adjustment.

The details of the circuit system shown in FIG. 4 particularly in respect to the flip-flop circuit are subject to considerable modification according to the desires of the designer. A specific circuit is here shown as a desirable arrangement since the equipment and components of the system are rugged and long-lived and are consistent in operation over a fairly wide range of ambient temperatures. It can be readily appreciated that any failure in the blade phase controller upstream of the rotary transformer 40 will merely terminate operation of the blade phase control system but will not affect propeller speed synchronization or otherwise normal functioning of any one of the propellers.

It will be clear to those skilled in the art that various changes and modifications may be made in the structure shown and described without departing from the spirit and scope of the invention as set out in the appended claims.

I claim:

1. A speed and phase synchronizing system for a plurality of aircraft propellers; comprising a master speed source; an acceleration stabilized governor for each propeller regulated by said master speed source and connected to effect changes in propeller blade pitch in response to deviations in propeller speed from the desired speed; and a polyphase synchronous electrical system connecting said speed source to each said governor, said polyphase synchronous system including a master blade phase generator on one propeller which generates an electrical pulse for each passage of a blade of the propeller relative to a datum point, a slave blade phase generator on each other propeller each similarly generating an electrical pulse for its propeller, a blade phase pulse comparator for each of said other propellers all connected to said master blade phase generator and each connected respectively to said slave blade phase generators, and an electrical phase shifting network for each of said other propellers controlled by respective comparators and located in the connection between the master speed source and the governors of said other propellers to modify the phase relationship between said speed source and the governors of said other propellers.

2. A system according to claim 1 wherein said comparators each comprise a D.C. power supply, a triggering circuit, triggering said D.C. "on" in response to one phase generator pulse and "off" in response to the other phase generator pulse, and a voltage averaging network fed by said triggering circuit.

3. In a multipowerplant speed and position control system, a master speed datum, a plurality of means each responsive to speed error between said datum and the actual speed of one powerplant, connections from said datum to each of the said means, a speed controller for each powerplant connected to and controlled by respective speed error responsive means, a device on each powerplant producing a pulse at each turn thereof and at a certain position in each turn during its rotation, one of said powerplants and its device comprising a pulse master and the others of said powerplants and their devices comprising pulse slaves, sensing means for the slave powerplants fed by master and respective slave pulses and comparing their relationship as to lead or lag in terms of a positive or negative D.C. voltage, means to chop said D.C. voltage to interrupted D.C. at a certain frequency, a two-phase servomotor having one winding energized at said certain frequency and another winding energized by said interrupted D.C. at a different electrical phase relation, a shifting device in the connections between said datum and the speed error responsive means of each slave powerplant, and drive means from each servomotor to respective shifting devices of said slave powerplants.

4. A multipowerplant speed and control system as defined in claim 3 wherein the shifting devices are rotary transformers.

References Cited in the file of this patent
UNITED STATES PATENTS

| | | |
|---|---|---|
| 2,517,703 | Offner | Aug. 8, 1950 |
| 2,747,141 | Hine | May 22, 1956 |
| 2,847,617 | Clark | Aug. 12, 1958 |
| 2,878,427 | Best | Mar. 17, 1959 |
| 2,887,621 | Wilde | May 19, 1959 |
| 2,972,087 | Chilman et al. | Feb. 14, 1961 |